United States Patent
Takagi

(10) Patent No.: US 7,037,225 B2
(45) Date of Patent: May 2, 2006

(54) AUTOMATIC V-BELT TRANSMISSION

(75) Inventor: Izumi Takagi, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 170 days.

(21) Appl. No.: 10/620,696

(22) Filed: Jul. 17, 2003

(65) Prior Publication Data

US 2004/0018903 A1    Jan. 29, 2004

(30) Foreign Application Priority Data

Jul. 25, 2002    (JP)    .............. P2002-216924

(51) Int. Cl.
*F16H 55/56*    (2006.01)

(52) U.S. Cl. ..................................... 474/8

(58) Field of Classification Search ............ 474/8–13, 474/18, 42, 45–46, 242, 201
See application file for complete search history.

(56) References Cited

U.S. PATENT DOCUMENTS

| | | | | |
|---|---|---|---|---|
| 2,187,188 A | * | 1/1940 | Whitcomb | ............ 474/42 |
| 2,905,005 A | * | 9/1959 | Miner | ............ 474/19 |
| 3,548,670 A | * | 12/1970 | Schnegg | ............ 474/8 |
| 2002/0077211 A1 | | 6/2002 | Drees et al. | |

FOREIGN PATENT DOCUMENTS

| | | | | |
|---|---|---|---|---|
| DE | (3204059 A | * | 8/1983 | ............ 474/8 |
| EP | WO (89/07724 A1 | * | 8/1989 | ............ 474/11 |
| IT | (574631) | * | 3/1958 | ............ 474/8 |
| JP | (59-97354 A | * | 6/1984 | ............ 474/8 |
| JP | 63-053352 | | 3/1988 | |
| JP | (63-53352 A | * | 3/1988 | ............ 474/13 |
| JP | 08-326859 | | 12/1996 | |
| JP | 11-165686 | | 6/1999 | |
| JP | 11-173392 | | 6/1999 | |

* cited by examiner

*Primary Examiner*—Marcus Charles
(74) *Attorney, Agent, or Firm*—Wenderoth, Lind & Ponack, L.L.P.

(57) ABSTRACT

A V-belt type of automatic transmitting mechanism includes a drive pulley and a V-belt, and the drive pulley includes a fixed sheave which is fixed to a drive shaft and a movable sheave which is movable in a direction of the drive shaft. When the drive shaft rotates at a higher speed, the movable sheave is moved towards the fixed sheave so that the radius of engagement between each of the sheaves and the V-belt increases. The conical pressure surface of the movable sheave is formed so that an inclined angle thereof is uniform from its radially inner peripheral part to its radially outer peripheral part. Meanwhile, the conical pressure surface of the fixed sheave is formed so that an inclined angle of its radially inner peripheral part is smaller than that of its radially outer peripheral part.

6 Claims, 8 Drawing Sheets

AUTOMATIC V-BELT TRANSMISSION

BACKGROUND OF THE INVENTION

1. Field of the Invention

The present invention relates to an automatic V-belt transmission which is suitable for vehicles such as four-wheeled all-terrain vehicles and two-wheeled vehicles.

2. Description of the Related Art

Conventionally, there has been provided an automatic V-belt transmission which has a belt clutch function from a view point of enhancing operability of a vehicle. In the mechanism, while an engine mounted on the vehicle is idling, the belt clutch is being disengaged so as not to cause any excessive creep phenomenon to the vehicle.

FIG. 10 shows a drive pulley 1 for the conventional automatic V-belt transmission having the belt clutch function. The drive pulley 1 has a drive shaft 10 connected to a crankshaft 8 of the engine, a fixed sheave 11 which is fixed to the drive shaft 10, a movable sheave 12 which can move in a direction of the drive shaft axis O1, a flyweight type of propulsion generating mechanism 15 for the drive pulley which is mounted behind the movable sheave 12, and so on.

The propulsion generating mechanism 15 has a flyweight 42 which expands radially outwardly due to its centrifugal force. That is, with the increase in the rotational speed of the drive shaft 10, the flyweight 42 expands outwardly, the flyweight 42 pushes a roller 44 of a spider 43 which is fixed to the drive shaft 10, and the movable sheave 12 and a spring receiving disk 38 fixed to the movable sheave 12 are integrally pushed toward the fixed sheave 11 against a biasing force of a return spring 46.

In the mechanism, in order to exert the belt clutch function while the engine is idling as shown in FIG. 10, there exists play (i.e. a clearance) between a side edge surface $3a$ of the V-belt 3 and a conical pressure surface $11a$ of the fixed sheave 11 and/or play between a side edge surface $3b$ of the V-belt 3 and a conical pressure surface $12a$ of the movable sheave 12, so that the disengagement of the clutch is maintained.

FIG. 11 is an enlarged longitudinal sectional view which shows sectional shapes of the V-belt 3, of the conical pressure surface $11a$ of the fixed sheave 11 of the drive pulley 1, and of the conical pressure surface $12a$ of the movable sheave 12 of the drive pulley 1, respectively. A pinching angle (V-angle) $2\alpha$ forming between the conical pressure surface $11a$ of the fixed sheave 11 and the conical pressure surface $12a$ of the movable sheave 12, is slightly smaller than a V-angle $2\beta$ between both of the side edges of the V-belt 3. Also, the conical pressure surfaces $11a$ and $12a$ are formed symmetrically with respect to a plane M which is perpendicular to the drive shaft axis O1, and the conical pressure surfaces $11a$ and $12a$ are formed such that each of inclined angles $\alpha$ and $\alpha$ between the plane M and the surfaces $11a$ and $12a$ is formed to be constant, from their radially inner part to their radially outer part.

According to the automatic V-belt transmission having the belt clutch function as shown in FIG. 10, a self-induced vibration (or self-excited oscillation) occurs in a circumferential direction of the drive pulley 1, on the basis of mutual slide between the V-belt 3 and the fixed sheave 11 and between the V-belt 3 and the movable sheave 12, in the operational region of the belt clutch from a state of idling of rotation up to a state of maximum reduction in speed (i.e. a state of low speed) through a half-clutch state. As a result, the self-induced vibration triggers the occurrence of so-called "belt squeaking noise (or belt squeaking sound)".

In order to reduce the noise, it is effective that the angular difference $(2\beta-2\alpha)$ between the V-angle $2\beta$ of the V-belt 3 and the pinching angle $2\alpha$ of the drive pulley 1 in the clutch operational region is made substantially larger by making the pinching angle $2\alpha$, shown in FIG. 11, smaller intentionally, such that offset load is exerted by the sheaves 11 and 12 about radially outer edge parts B, B of the V-belt 3, and contact pressures between the side edge surfaces $3a$, $3b$ and the conical pressure surfaces $11a$, $12a$ are increased.

However, in a case of biasing the contacting region of the V-belt 3 and the conical pressure surfaces $11a$, $12a$ of the drive pulley 1 towards the radially outer edge part B by making the angular difference between the V-angle $2\beta$ and the pinching angle $2\alpha$ large, contact pressure centers between the side edge surfaces $3a$, $3b$ of the V-belt 3 and the conical pressure surfaces $11a$, $12a$ of the sheaves 11, 12 may be swerved relative to each other, due to the variation, caused upon manufacturing, in each of inclined angles $\beta$ forming the V-angle $2\beta$ of the V-belt 3, and due to the variation in each of the inclined angles $\alpha$ of the conical pressure surfaces $11a$ and $12a$ of the sheaves 11 and 12. As a result, there arises a moment which twists the V-belt 3 in directions shown by reference characters A and A in FIG. 11.

In the clutch operational region in which the V-belt 3 slowly moves over the conical pressure surfaces $11a$ and $12a$ while sliding over the surfaces $11a$ and $12a$, the contact pressure centers of both of the side edge surfaces $3a$ and $3b$ of the V-belt 3 subtly change, and the direction of the aforementioned twisting moment changes. Namely, the V-belt 3 is transferred over the conical pressure surfaces $11a$ and $12a$ while causing the twisting vibration, the characteristics of the friction being exerted therebetween changes, and the self-induced vibration having a relatively long period, or so-called "judder phenomenon", easily occurs.

On the other hand, Japanese Laid-Open Patent Publication No. 8-326859 discloses an automatic V-belt transmission, in which the inclined angle of the radially inner peripheral side is smaller than the inclined angle of the radially outer peripheral side by making the conical pressure surface of the drive pulley be double-angled. The mechanism intends to prevent the belt squeaking noise by making both of the sheaves on the fixed side and the movable side be double-angled symmetrically. According to the mechanism, it is possible to prevent the generation of the squeaking noise of the belt in the clutch operational region. However, it is not possible to suppress the judder phenomenon of the belt due to the generation of the twisting moment.

SUMMARY OF THE INVENTION

Therefore, it is an object of the present invention to provide an automatic V-belt transmission, in which both of a squeaking phenomenon and a judder phenomenon of the V-belt can be suppressed in a belt clutch operational region.

In accomplishing the object of the present invention, there is provided an automatic V-belt transmission comprising: a drive pulley; a driven pulley; and a V-belt extending between the drive pulley and the driven pulley, wherein the drive pulley has: a fixed sheave which is rigidly fixed to a drive shaft of the drive pulley; and a movable sheave which is movable on the drive shaft in a direction of an axis of the drive shaft, wherein the fixed sheave and the movable sheave include a conical pressure surface having an inclined angle with respect to a surface perpendicular to the axis of the drive shaft, respectively, and the conical pressure surface of the fixed sheave and the conical pressure surface of the movable sheave form a V-shaped groove of the drive pulley, which opens radially outwardly, in which the movable sheave is moved toward the fixed sheave by a propulsion generating mechanism for the drive pulley as rotational speed of the drive shaft increases, so that radius of contact of the drive pulley with the V-belt increases, wherein the conical pressure surface of one of the fixed sheave and the movable sheave is formed to have the inclined angle being constant from a radially inner part of the conical pressure surface to a radially outer part of the conical pressure surface, and wherein the conical pressure surface of the other of the fixed sheave and the movable sheave is formed to have an angular turning boundary that the inclined angle varies thereon, in which the inclined angle of a radially inner part inside the angular turning boundary of the conical pressure surface is smaller than the inclined angle of a radially outer part outside the angular turning boundary of the conical pressure surface, and in which an angular difference between the radially inner part of the conical pressure surface and a side edge surface of the V-belt is greater than an angular difference between the radially outer part of the conical pressure surface and the side edge surface of the V-belt.

With the mechanism, both of the squeaking phenomenon and the judder phenomenon of the V-belt can be suppressed effectively in the belt clutch operational region, as explained below. That is, according to the mechanism, the inner part of the conical pressure surface double-angled exerts a concentrated load (offset load) upon the part, having the maximum width, of the V-belt under a high pressure, in the belt clutch operational region. Therefore, a coefficient of the kinetic friction acting between the V-belt and the conical pressure surface becomes closer to the coefficient of the static friction. Thereby, the self-induced vibration (or self-excited oscillation), that is, the squeaking noise of the V-belt is suppressed.

On the other hand, the conical pressure surface, having the constant inclined angle, of the one of the fixed sheave and the movable sheave, contacts a generally total area of the side edge surface of the V-belt. Therefore, even if the offset load is exerted upon the part of the V-belt by the inclined pressure surface of the other which is double-angled, the generation of twisting moment to the V-belt, is effectively suppressed by the constant inclined conical pressure surface. Namely, the twisting vibration or oscillation of the V-belt is prevented, thus suppressing the judder phenomenon.

In the above mechanism, the one of the fixed sheave and the movable sheave can be the movable sheave, and wherein the other of the fixed sheave and the movable sheave can be the fixed sheave.

This arrangement is suitable for the automatic V-belt transmission, in which the propulsion generating mechanism for the drive pulley is mounted on a side of the movable sheave that has a high rigidity, and in which the fixed sheave is formed thinner in order to reduce the overhanging amount of the drive shaft which is cantilevered for its support. In the arrangement, the inclined angle of the conical pressure surface of the movable sheave having the high rigidity is constant. In this case, since the surface pressure on a side of the movable sheave is low in the belt clutch operational region, the self-induced vibration or oscillation may be caused to the V-belt. However, resonance of the movable sheave having the high rigidity hardly occurs. Namely, the belt squeaking noise is suppressed effectively.

Alternatively, the one of the fixed sheave and the movable sheave can be the fixed sheave, and wherein the other of the fixed sheave and the movable sheave can be the movable sheave.

This arrangement is suitable for the automatic V-belt transmission, in which the rigidity of the fixed sheave is higher than that of the movable sheave. In the arrangement, the inclined angle of the fixed sheave having the high rigidity is formed to be constant. Therefore, even if the surface pressure on a side of the fixed sheave is low in the belt clutch operational region, and even if the self-induced vibration or oscillation is caused to the V-belt as a result, resonance of the fixed sheave having the high rigidity hardly occurs. Namely, with the arrangement, the belt squeaking noise is suppressed effectively.

In each of the above mechanisms, preferably, the angular turning boundary of the conical pressure surface is provided in a vicinity of a position at which a maximum width part of the V-belt contacts the conical pressure surface when the V-belt and the drive pulley are at a position of maximum reduction in speed.

In the mechanism, the "position of maximum reduction in speed" is such a position in which a reduction ratio in rotational speed between the drive pulley and the driven pulley is the maximum in a state in which there is no substantial slippage between the drive pulley and the V-belt engaging with the drive pulley. According to the mechanism, not only the squeaking noise of the clutch caused by the relative sliding between the V-belt and the sheave as aforementioned, but also the judder phenomenon caused by the twisting vibration of the V-belt, are both suppressed. In addition, when the V-belt becomes positioned on a side of higher speed (i.e. more outside radially) than the position of the maximum reduction in speed, a generally total area of each of the side edge surfaces of the V-belt contacts the conical pressure surface of each of the fixed sheave and the movable sheave with a pressure higher than a predetermined pressure. Therefore, in the operation, enough area of contact therebetween and enough pressure for pinch being exerted therebetween, are both secured. Namely, with the mechanism, a high efficiency of transmission of driving force from the V-belt to the drive pulley, and the prevention of wear of the V-belt and of both of the sheaves, can be surely realized.

BRIEF DESCRIPTION OF THE DRAWINGS

This and other objects and features of the present invention will become clear from the following description taken in conjunction with the preferred embodiment thereof with reference to the accompanying drawings.

DETAILED DESCRIPTION OF THE PREFERRED EMBODIMENT

Figure 1:
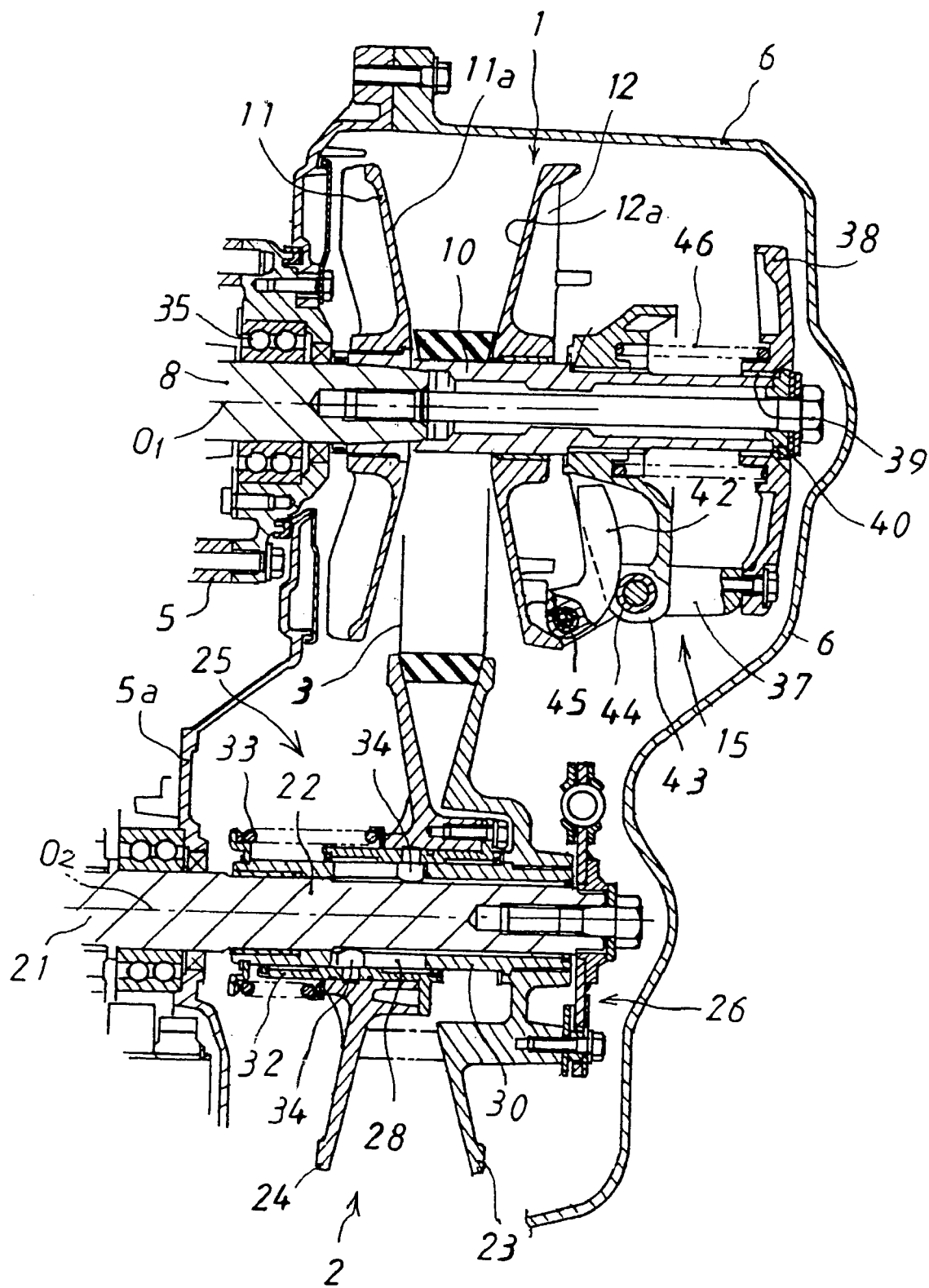
FIG. 1 is a longitudinally sectional view showing an automatic V-belt transmission according to a preferred embodiment of the present invention.

Before a description of the preferred embodiment of the present invention proceeds, it is to be noted that like or corresponding parts are designated by like reference numerals throughout the accompanying drawings.

With reference to FIGS. 1 through 9, the description is made below upon an automatic V-belt transmission, applied to a four-wheeled all-terrain vehicle as one example, according to a preferred embodiment of the present invention and to its modifications.

That is, as shown in FIG. 1 which is a longitudinally sectional view of the automatic V-belt transmission, the transmission has a drive pulley 1, a driven pulley 2, and a V-belt 3 which extends over both of the pulleys 1 and 2. The transmission is housed inside a belt converter cover 6 which is mounted on the right side of a crankcase 5. The drive pulley 1 has a drive shaft 10 which is connected to a crankshaft 8 of an engine, a fixed sheave 11 which is radially fixed to the drive shaft 10, a movable sheave 12 which engages with the drive shaft 10 movably in a direction of a drive shaft axis O1 of the drive shaft 10, and a flyweight type of propulsion generating mechanism 15 for the movable sheave 12, and so on. The driven pulley 2 has a driven shaft 22 which is connected to an input shaft 21 of the transmission, a fixed sheave 23, a movable sheave 24, a cam groove type of pressure adjustment mechanism 25, and a damper mechanism 26.

(Mechanism of Driven Pulley)

The driven shaft 22 is cantilevered so as to project rightward, by a transmission case 5*a* of the crankcase 5. The fixed sheave 23 is arranged adjacent to the right end of the driven shaft 22, and the sheave 23 is connected to the driven shaft 22 via the damper mechanism 26. The fixed sheave 23 has a radially inner peripheral end part to which a cam shaft 30 having a plurality of spiral-shaped cam grooves 28 is fixed. The cam shaft 30 engages with an outer surface of the driven shaft 22. The movable sheave 24 is mounted from the left side in the figure so as to oppose the second fixed sheave 23. The sheave 24 has a radially inner peripheral end part to which a sleeve 32 for supporting a roller 34 is fixed integrally. The sleeve 32 engages with an outer surface of the cam shaft 30 so as to be movable in a direction of a driven shaft axis O2. The sleeve 32 is biased toward the fixed sheave 23 (i.e. rightward in the FIG. 1) by a pressure adjustment spring 33, so that the radius (i.e. radius of contact) of the driven pulley 2 contacting the V-belt 3 is maintained maximum (i.e. low position) by the spring 33.

The roller 34 is movably supported inside the spiral-shaped groove 28. When the tension of the V-belt 3 on a pulled side thereof increases as the load of wheels of the vehicle increases upon the vehicle's running, the movable sheave 24 rotates relatively with respect to the fixed sheave 23 in its rotational direction. At this time, both of the sleeve 32 and the movable sheave 24 are spirally moved rightward relative to the cam shaft 30 on the basis of the cam action exerted between the cam groove 28 and the roller 34, so that the radius of contact of the driven pulley 2 increases.

(Mechanism of Drive Pulley)

The drive shaft 10 projects into the belt converter cover 6 from the crankcase 5, and the shaft 10 is cantilevered by a right bearing 35 of the crankcase 5. The fixed sheave 11 is fastened on a left end of the drive shaft 10 (i.e. adjacent to the right bearing 35) with a screw. The movable sheave 12 opposes the fixed sheave 11 from the right hand side, and the sheave 12 engages with the drive shaft 10 movably in the direction of the drive shaft axis O1. A conical pressure surface 11*a* of the fixed sheave 11 and a conical pressure surface 12*a* of the movable sheave 12 form a V-shaped groove between them for supporting the V-belt 3.

A spring receiving disk 38 is connected to a rear surface of the movable sheave 12 via a plurality of coupling arms 37 extending from the back surface of the movable sheave 12 rightward in the figure. The disk 38 engages with an outer surface of the drive shaft 10 via a bearing metal 39, movably in the direction of the drive shaft axis O1, and the right extremity (maximum opening position of the movable sheave) in movement of the disk 38 is limited by a locking ring 40 which is fixed on the drive shaft 10.

The flyweight type of propulsion generating mechanism 15 for the movable sheave 12, is mounted between the rear surface of the movable sheave 12 and the spring receiving disk 38. The mechanism 15 has flyweights 42, a spider 43 and rollers 44. The spider 43 integrally has a plurality of arm parts extending radially to engage circumferentially with the coupling arms 37, and the spider 43 is fastened to the drive shaft 10 with a screw. In the arrangement, the movable sheave 12 all the time rotates integrally together with the drive shaft 10 via the spider 43.

Each of the flyweights 42 is pivotally supported on the movable sheave 12 through a pin 45 so as to be turnable radially on the pin 45, and the flyweight 42 contacts the roller 44. There is mounted a return spring 46, compressed, between the spider 43 and the spring receiving disk 38. The return spring 46 controls a speed change ratio (contact radius of the V-belt 3 and the drive pulley 1) by taking a balance with a centrifugal force of the flyweight 42. The return spring 46 biases both of the movable sheave 12 and the spring receiving disk 38 rightward in FIG. 1.

Figure 6:
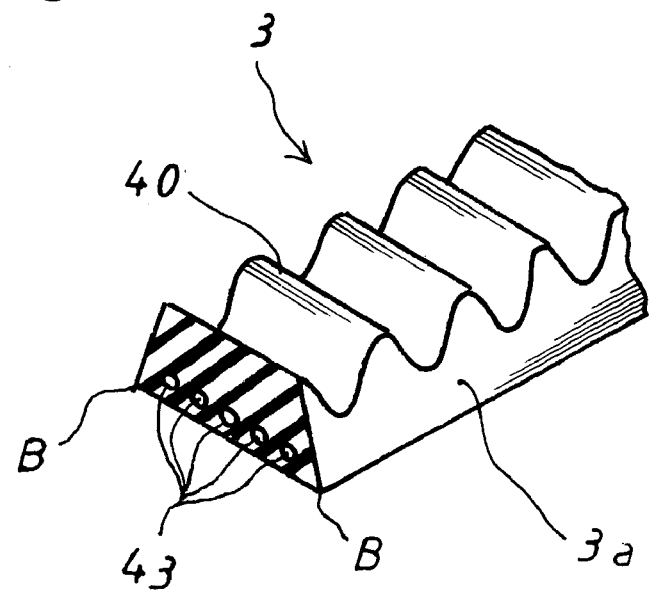
FIG. 6 is a perspective view showing a partial section of the V-belt of FIG. 1.

FIG. 6 is a perspective view showing a partial section of the V-belt 3. As shown in the figure, the V-belt 3 is a cog belt, and the inner side of the belt 3 has a plurality of rack-shaped humps 40 at regular intervals (or at even intervals). With the configuration of the belt, the V-belt 3 is easy to bend inwardly. Inside a body of the V-belt 3, a plurality of metal core wires 43 are embedded.

Figure 2A:
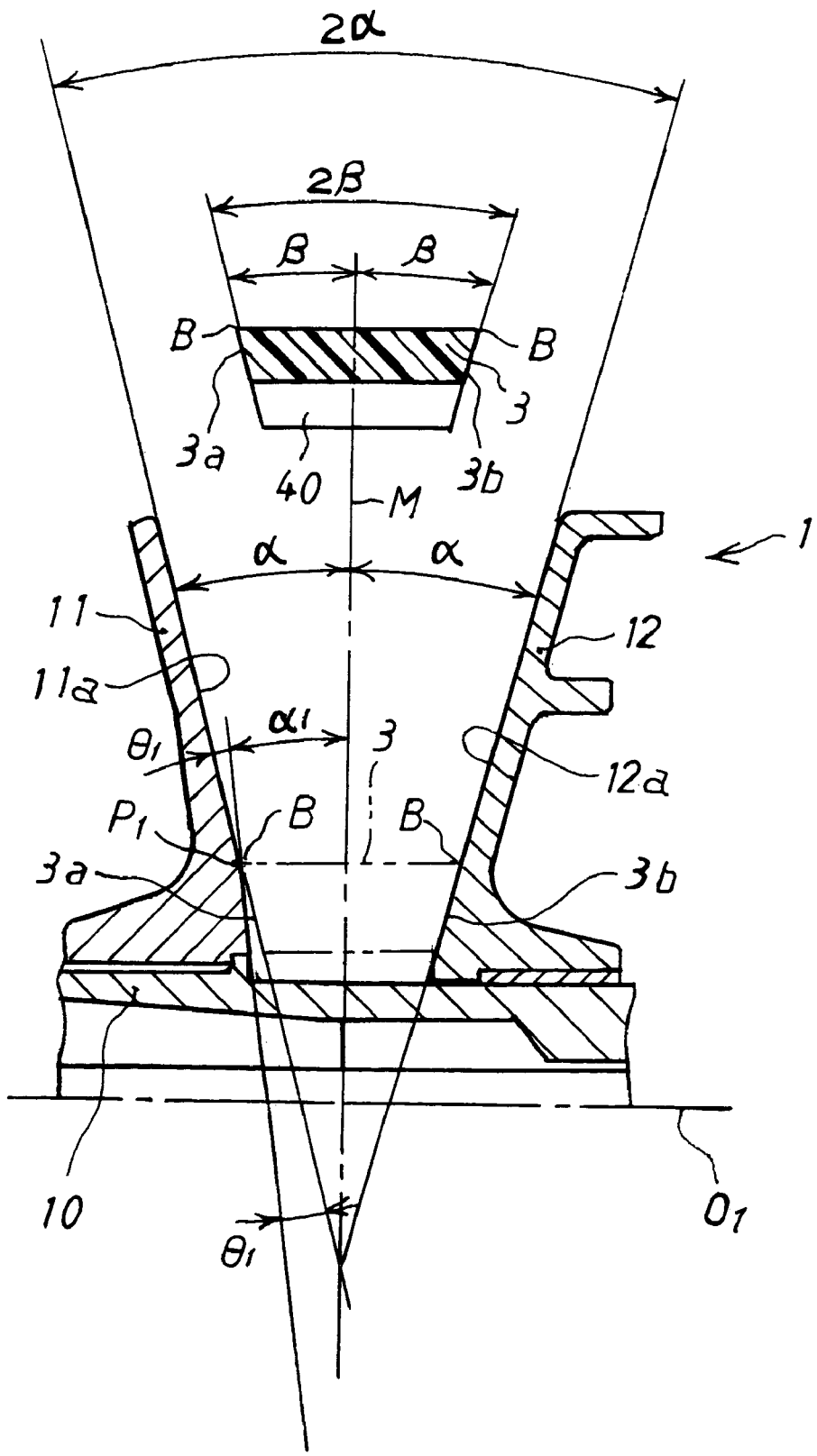
FIG. 2A is a view showing a section of a V-belt of FIG. 1 and showing a partial section of a drive pulley thereof.

FIG. 2A is a view showing a section of the V-belt 3 and showing a relation between the conical pressure surface 11*a* of the fixed sheave 11 and the conical pressure surface 12*a* of the movable sheave 12 of the drive pulley 1. As shown in the figure, the V-belt 3 has a construction such that its radially outer part is wider in section than its radially inner part, like a trapezoid. In the embodiment, a V-angle 2 β of the V-belt 3 is set to be 27.0–30.0 degrees, for example.

The sectional shape of the V-belt 3 is symmetrical with respect to a perpendicular plane M which is perpendicular to the drive shaft axis O1. In this arrangement, a left side edge surface 3*a* of the V-belt 3 and a right side edge surface 3*b* thereof tilt so that an inclined angle β formed between the left side edge surface 3*a* and the perpendicular plane M, is equal to an inclined angle β forming between the right side edge surface 3b and the perpendicular plane M. In the embodiment, the inclined angle β is set within a range of 13.5 to 15.5 degrees, for example.

The conical pressure surface 12a of the movable sheave 12 tilts uniformly, so that an inclined angle α(i.e. apex angle) between the perpendicular plane M and the conical pressure surface 12a is constant, from the radially inner part of the surface 12a up to the radially outer part thereof. The inclined angle α is slightly smaller (for example, approximately 0.5–4.0 degrees smaller) than the inclined angle β of the V-belt 3. In the embodiment, the inclined angle α is set to be 13.0 degrees.

On the other hand, as shown in FIG. 2A, an inclined angle α between the perpendicular plane M and the conical pressure surface 11a of the fixed sheave 11 changes on an angular turning boundary (angular turning position) P1. Namely, the inclined angle α of a radially outer part outside the angular turning boundary P1 of the conical pressure surface 11a is set to be equal to that (i.e. 13.0 degrees) of the conical pressure surface 12a of the movable sheave 12, and the inclined angle α of a radially inner part inside the angular turning boundary P1 of the conical pressure surface 11a is set to be an inclined angle α 1 which is smaller than the inclined angle α of the radially outer part. In the embodiment, the inclined angle α 1 is set to be 10.0 degrees, for example.

That is, the shape of the V-shaped groove of the drive pulley 1 is symmetrical radially outside the angular turning boundary P1 with respect to the perpendicular plane M. Meanwhile, the shape of the groove is asymmetrical radially inside the angular turning boundary P1 with respect to the perpendicular plane M. Namely, an angular difference (β−α1=θ) between the conical pressure surface 11a, radially inside the angular turning boundary P1, of the fixed sheave 11 and the left side edge surface 3a of the V-belt 3, is set to be greater than an angular difference (β−α) between the conical pressure surface 12a of the movable sheave 12 and the right side edge surface 3b of the V-belt 3.

The angular turning boundary P1 is provided at a location of the conical pressure surface 11a to which the maximum width parts B and B (or radially outer edge parts) of the V-belt 3 generally correspond, in a state in which the V-belt 3 has moved radially outwardly up to a location of maximum reduction in speed of the automatic V-belt transmission (low speed location) shown by an imaginary line in FIG. 2A. As shown in FIG. 2A, the angular turning boundary P1 is located in a circumference on a radially inner part, inside a radially middle portion, of the conical pressure surface 11a. The terminology of the "location (position) of maximum reduction in speed" means such a location as that in which a reduction ratio in rotational speed between the drive pulley 1 and the driven pulley 2 is the maximum in a state in which there is no significant slippage between the drive pulley 1 and the V-belt 3 engaging with the drive pulley 1.

As described above, the inclined angle α of the conical pressure surfaces 11a, 12a is set to be smaller than the inclined angle β of the V-belt 3. Therefore, a pinching angle 2 α formed between the conical pressure surfaces 11a and 12a of the drive pulley 1 is smaller than the V-angle 2 β of the V-belt 3.

When the V-belt 3 is wound around the drive pulley 1, the V-belt 3 is bent, the radially inner part of the belt 3 is compressed, and the radially outer part thereof is pulled. As a result, the V-angle 2 β becomes smaller. Particularly, such a tendency increases in a location adjacent to the low speed location (low location) where the radius of curvature of the V-belt 3 becomes smaller. Therefore, allowing for the amount of reduction of the V-angle 2 β, the pinching angle 2 α is set to be slightly smaller than the V-angle 2 β of the V-belt 3, so as to become generally equal to the V-angle 2 β of the V-belt 3, when the belt 3 is wound on the drive pulley 1.

Next, operation of the automatic V-belt transmission is explained.

(At Time of Engine Stop)

FIG. 1 shows a condition in which the engine stops. In the condition, the movable sheave 12 and the spring receiving disk 38 are integrally at a maximum opening position, i.e., at a right-most position (a right-most extremity in position), in the figure by the return spring 46. In the condition, the belt clutch is under disengagement, under which there exists play between each of the conical pressure surfaces 11a, 12a of the drive pulley 1 and each of the side edge surfaces 3a, 3b of the V-belt 3 in the direction of the drive shaft axis O1, respectively.

(At Time of Engine Start)

When the engine is started up from the state as shown in FIG. 1, the flyweight 42 starts to open radially outwardly due to its centrifugal force exerted upon the flyweight 42. Simultaneously, the movable sheave 12 and the spring receiving disk 38 start moving towards the fixed sheave 11 (leftward together in the figure), against the biasing force of the return spring 46.

(At Time of Idling)

Figure 3:
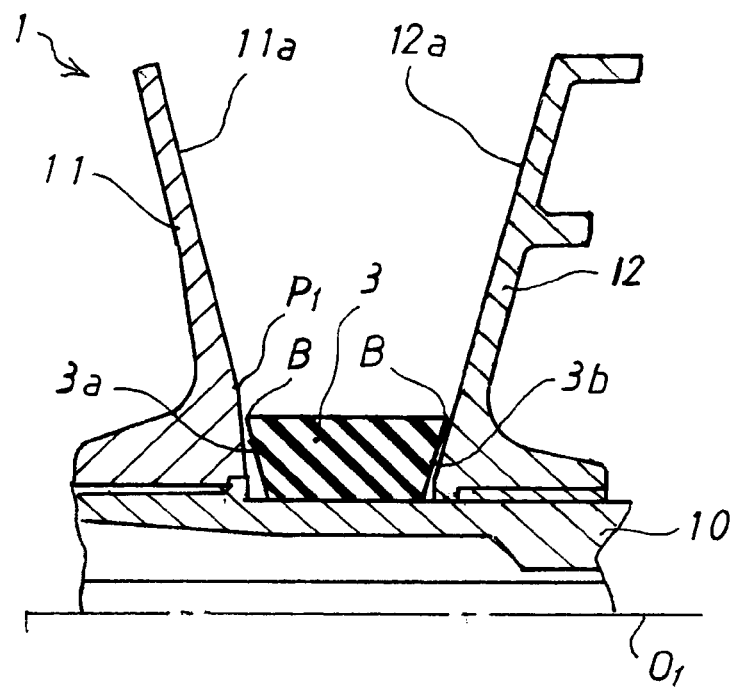
FIG. 3 is a partially sectional view showing the drive pulley, of FIG. 1, which is in a state of idling.

FIG. 3 shows a state in which the engine is idling (900–1000 rpm, for example). In this idling state, there still exists play between each of the conical pressure surfaces 11a, 12a of the drive pulley 1 and each of the side edge surfaces 3a, 3b of the V-belt 3, respectively. In this state, the disengagement of the belt clutch is maintained.

(Operational Region of Clutch)

Figure 4:
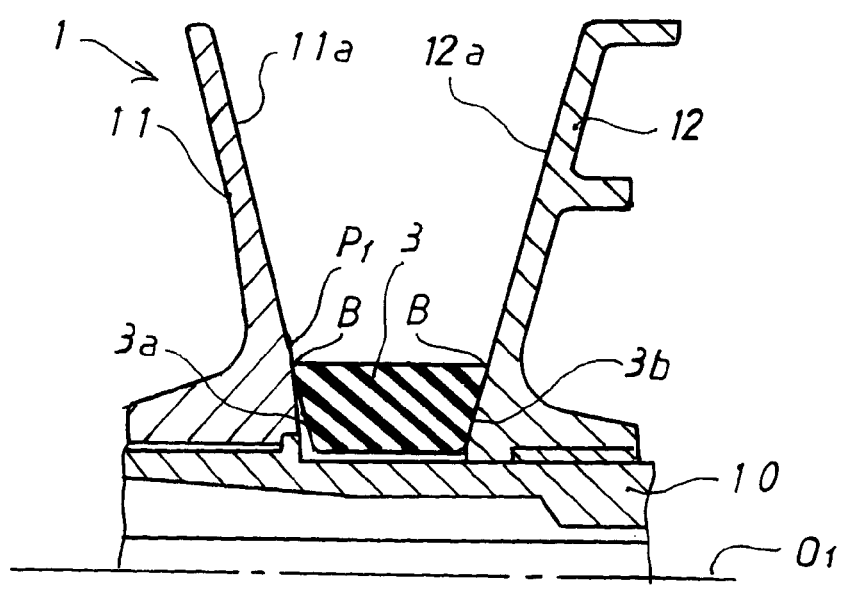
FIG. 4 is a partially sectional view showing the drive pulley, of FIG. 1, which is in a state of half-clutch in a clutch operational region.

As the rotational speed of the drive shaft 10 increases from the idling state shown in FIG. 3, both of the left side edge surface 3a and the right side edge surface 3b of the V-belt 3 are pinched with a pressure by the conical pressure surface 11a of the fixed sheave 11 and the conical pressure surface 12a of the movable sheave 12 as shown in FIG. 4, the radius of contact between the drive pulley 1 and the V-belt 3 increases, and a driving force of the engine starts to be transmitted from the drive pulley 1 to the V-belt 3. Namely, the V-belt 3 starts to move radially outwardly of the sheaves 11 and 12, and the state of the belt clutch starts changing from a state in which the clutch is disengaged (i.e. clutch off) to a state in which the clutch is half-disengaged (i.e. half clutch). In the specification, the terminology of "disengagement" of clutch generally means that the driving force is not transmitted from the V-belt 3 to the drive pulley 1, and the terminology of "half-disengagement" generally means that part of the driving force of the engine is transmitted from the drive pulley 1 to the V-belt 3.

In the state of the half-disengagement of clutch as shown in FIG. 4, the maximum width part (radially outer edge part) B of the V-belt 3 is located on the radially inner part inside the angular turning boundary P1 of the conical pressure surface 11a of the fixed sheave 11. In this state, the right side edge surface 3b of the V-belt 3 contacts approximately uniformly with the conical pressure surface 12a of the movable sheave 12. However, since the inclined angle α 1 of the radially inner part inside the angular turning boundary P1 of the conical pressure surface 11a of the fixed sheave 11 is small with respect to the inclined angle β of the V-belt 3, the left side edge surface 3a of the V-belt 3 partially contacts the conical pressure surface 11a of the fixed sheave 11, mainly around the portion of the left side of the maximum width part (radially outer part) B of the V-belt 3.

That is, in the state shown in FIG. 4, a concentrated load (an offset load) is exerted around the contact portions of the conical pressure surface 11a and the left side edge surface 3a (the left maximum width part B) of the V-belt 3. Therefore, the pressure of the contact surface between the conical pressure surface 11a and the left side edge surface 3a is increased so that a coefficient of kinetic (or dynamic) friction therebetween becomes closer to a coefficient of static friction. Namely, with this arrangement, the self-induced vibration (self-excited oscillation) having a high frequency of the V-belt 3 in the circumferential direction decreases, so that the squeaking noise of the V-belt 3 is effectively reduced.

Meanwhile, the conical pressure surface 12a of the movable sheave 12 generally contacts the whole area of the right side edge surface 3b of the V-belt 3 uniformly so that the twisting moment (or torsional moment) of the V-belt 3 is less generated, even if the offset load is exerted from the side of the fixed sheave 11 as aforementioned. In other words, with the arrangement, the twisting vibration (or oscillation) is less generated, and the judder phenomenon is reduced effectively.

By the way, as aforementioned, the conical pressure surface 12a of the movable sheave 12 generally contacts the whole surface of the right side edge surface 3b of the V-belt 3, and the surface pressure exerted upon the right side edge surface 3b of the V-belt 3 is lower than the surface pressure exerted upon the left side edge surface 3a of the V-belt 3. Therefore, the self-induced vibration of the V-belt 3 in the circumferential direction may seem easy to occur. However, in the automatic V-belt transmission according to the preferred embodiment, the movable sheave 12 has the propulsion generating mechanism 15 having a large mass on its back side, as shown in FIG. 1. In other words, the movable sheave 12 has a much higher rigidity than that of the fixed sheave 11. With the higher rigidity, the resonance of the movable sheave 12 is suppressed, and the belt squeaking noise on the side of the movable sheave 12 is suppressed effectively.

(Position of Maximum Reduction in Speed (Low Speed Position))

The position shown by an imaginary line in FIG. 2A, indicates a position of the maximum reduction in speed (or low speed position) of the drive pulley 1 and the V-belt 3, which is more outward radially than the position of the half-disengagement of the clutch shown in FIG. 4. In the position of maximum reduction in speed, too, the conical pressure surfaces 11a, 12a of the sheaves 11, 12 of the drive pulley 1 contact the left and right side edge surfaces 3a, 3b of the V-belt 3, in a state similar to the state shown in FIG. 4. Therefore, both of the squeaking noise of the V-belt 3 and the judder phenomenon thereof, are suppressed.

Figure 5:
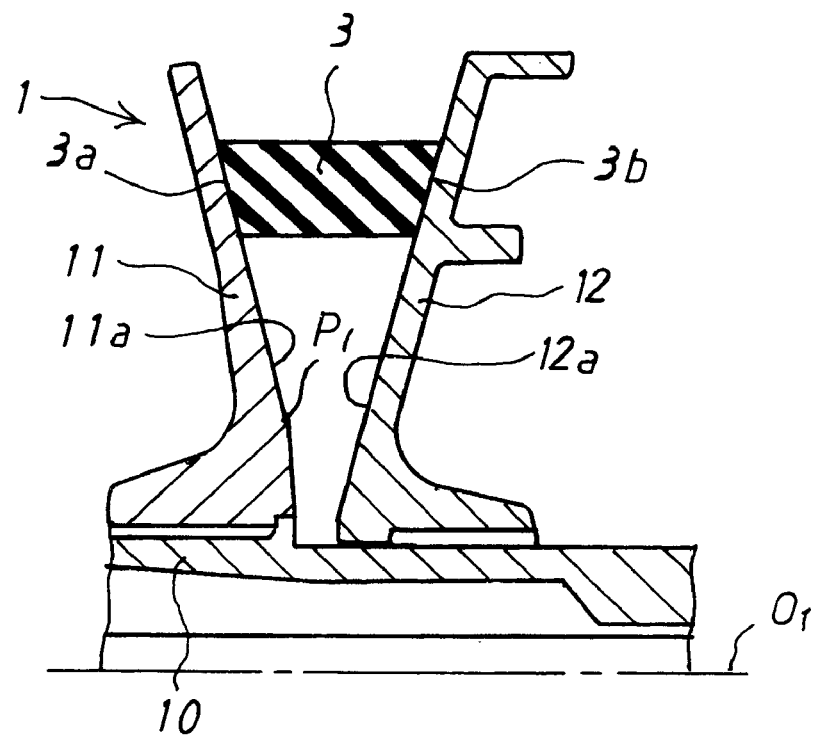
FIG. 5 is a partially sectional view showing the drive pulley, of FIG. 1, which is in a state of a high speed position.

When the rotational speed of the drive shaft 10 increases from the state of maximum reduction in speed as shown in FIG. 2A, the V-belt 5 moves more outwardly radially to reach the high speed position, as shown in FIG. 5. In the high speed position, similar to the right side edge surface 3b of the V-belt 3, the generally whole surface of the left side edge surface 3a uniformly contacts the conical pressure surface 11a having the inclined angle α. In this state, since the V-belt 3 extends with a high tension higher than a predetermined tension, the V-belt 3 can contact the conical pressure surfaces 11a, 12a with higher contact pressure with large contact area. Therefore, in this state, a high efficiency of transmitting the driving force between the V-belt 3 and the drive pulley 1 is realized, and also the wear thereof is suppressed efficiently.

Next, with reference to each of FIGS. 7 and 8, another type of a V-belt 3, employed for the automatic V-belt transmission, is described below.

Figure 7:
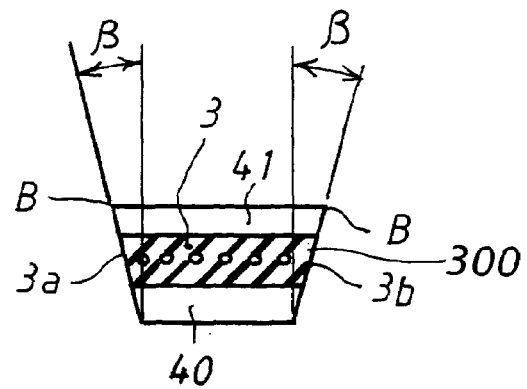
FIG. 7 is a sectional view showing a V-belt according to a modification.

FIG. 7 shows the V-belt 3 according to the first modification. As shown in the figure, the V-belt 3 has a rack-shaped inner hump 40 on its inner side, and has a rack-shaped outer hump 41 on its outer side. Both side edge surfaces 3a, 3b of the outer hump tilt at the same inclined angle as the inclined angle β of a body part 300 of the V-belt 3. Therefore, the maximum width part B is the radially outermost edge part of the outer hump 41.

Figure 8:
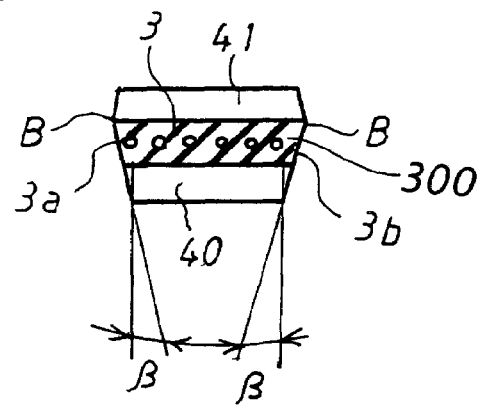
FIG. 8 is a sectional view showing a V-belt according to a modification.

On the other hand, FIG. 8 shows the V-belt 3 according to the second modification. As shown in the figure, the V-belt 3 has a configuration in which both side edges of the outer hump 41 taper so that the width between the side edges becomes narrower outwardly. Therefore, with this configuration, the maximum width part B of the V-belt 3 is the radially outermost edge part of the main body part 300 of the V-belt 3.

Figure 9:
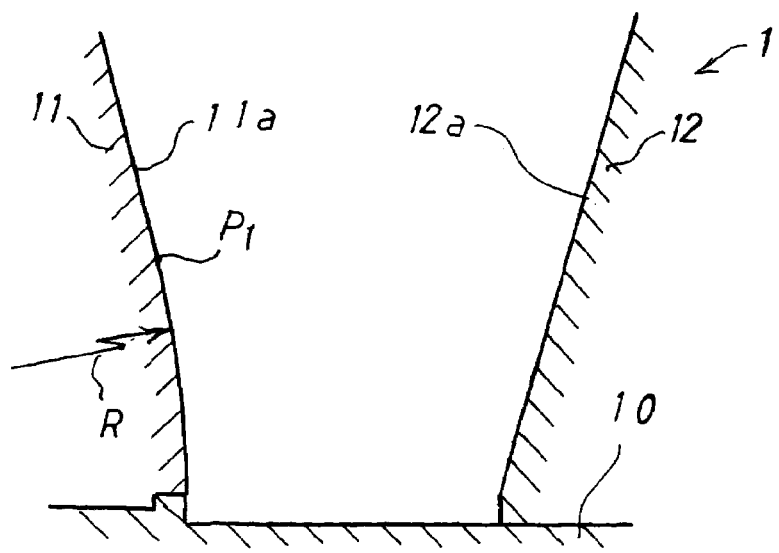
FIG. 9 is a partially sectional view showing a drive pulley having a conical pressure surface according to a modification.
Figure 10:
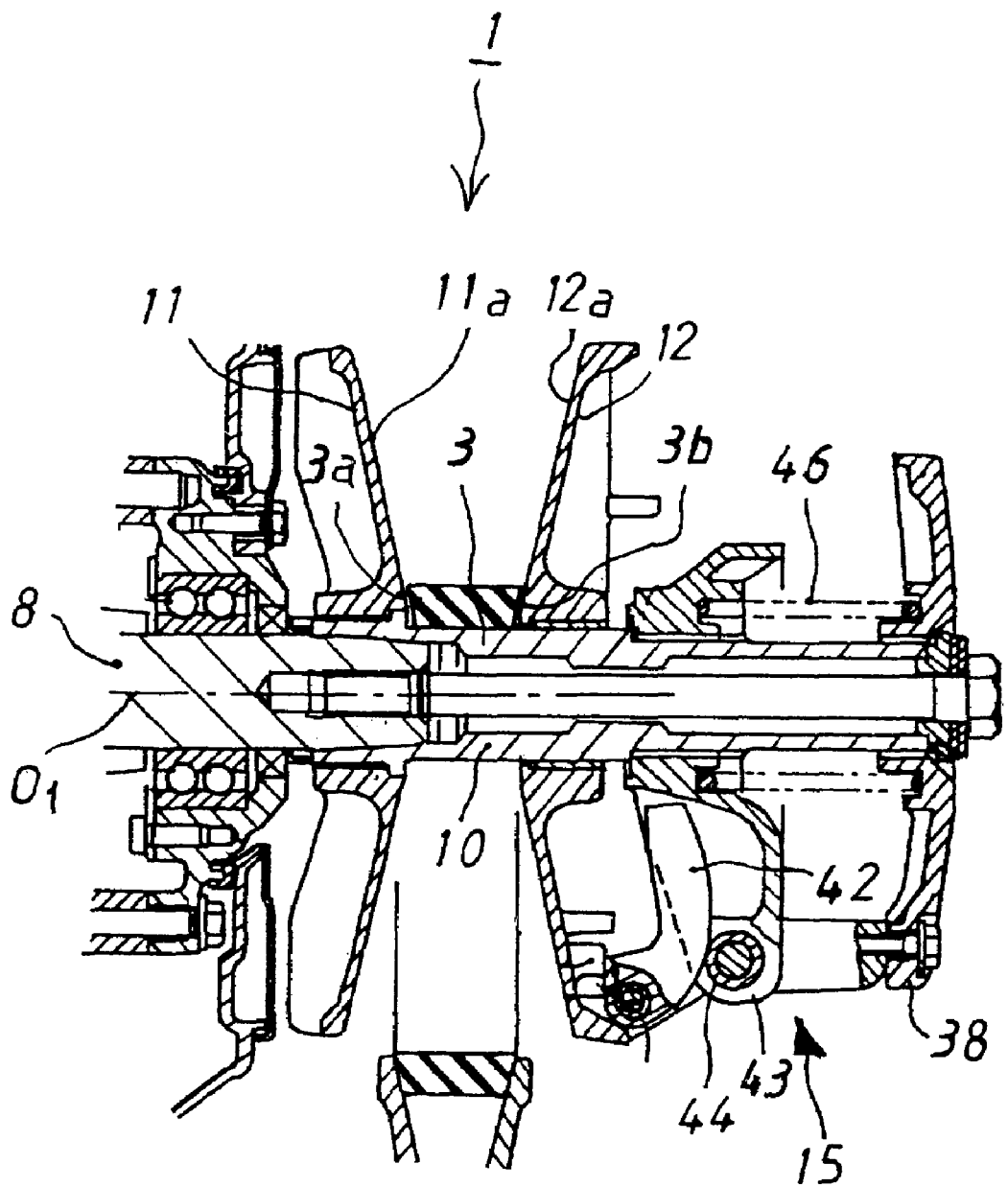
FIG. 10 is a sectional view of a drive pulley of a conventional automatic V-belt transmission.
Figure 11:
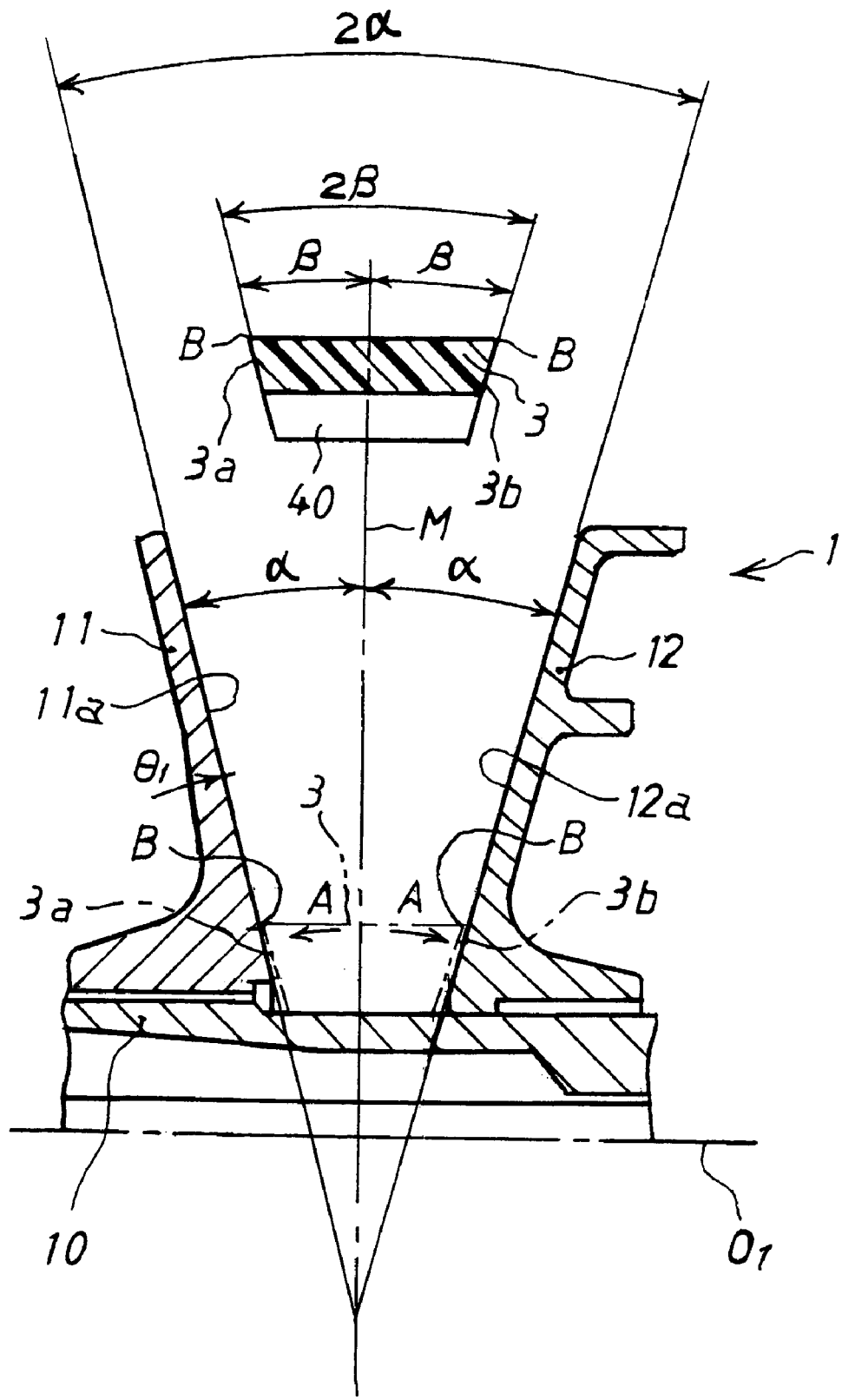
FIG. 11 is a partially enlarged view of FIG. 10.

Next, with reference to FIG. 9, a fixed sheave 11 employed for the automatic V-belt transmission, according to a modification, is described below.

Namely, according to this modification, the inner part, inside the angular turning boundary P1 of the conical pressure surface 11a of the fixed sheave 11 is formed as a circular arc. In this configuration, the inclined angle of the arc portion is set to be smaller than the inclined angle radially outside the angular turning boundary P1.

Figure 2B:
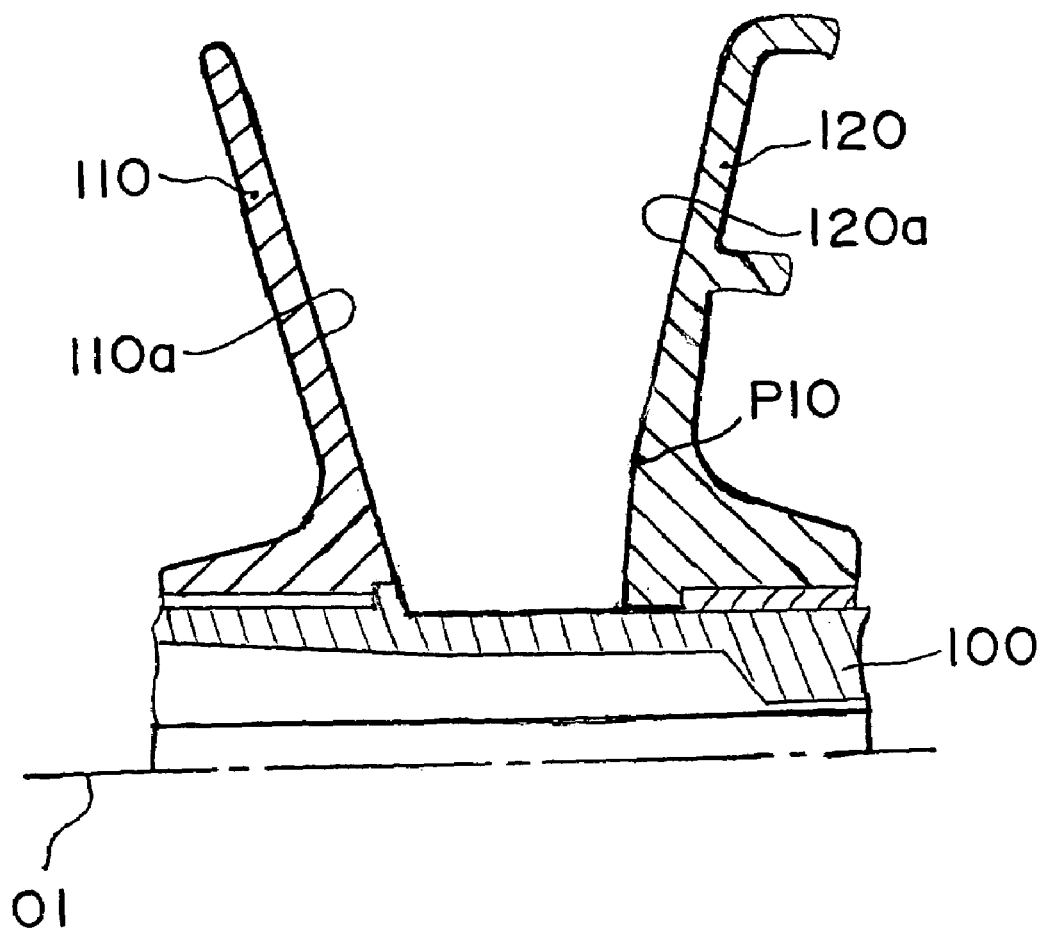
FIG. 2B is a view showing a partial section of the drive pulley according to a modification.

In the above described embodiment and modification, the conical pressure surface 12a of the movable sheave 12 has the uniform inclined angle whilst the conical pressure surface 11a of the fixed sheave 11 has the non-uniform inclined angle. Alternatively, in a case that the automatic V-belt transmission has a construction in which the fixed sheave has a higher rigidity than that of the movable sheave, as shown in FIG. 2B, it is possible to construct the movable sheave so that the conical pressure surface has the non-uniform inclined angle instead of the fixed sheave and to construct the fixed sheave so that the conical pressure surface has the uniform inclined angle instead of the movable sheave. With the construction, it is also possible to prevent the resonance from occurring in the V-belt. FIG. 2B shows the drive pulley according to the modification. Namely, in FIG. 2B, a reference numeral 110 points to the fixed sheave, 110a to the conical pressure surface of the fixed sheave 110, 120 to the movable sheave, 120a to the conical pressure surface of the movable sheave 120, O1 to the drive shaft axis, and 100 to the drive shaft. As shown in the figure, a reference numeral P10 points to the angular turning boundary, and the boundary locates on the side of the movable sheave 120.

Although the present invention has been fully described in connection with the preferred embodiment thereof with reference to the accompanying drawings, it is to be noted that various other changes and modifications are also apparent to those skilled in the art. Such changes and modifications are to be understood as included within the scope of the present invention as defined by the appended claims unless they depart therefrom.

What is claimed is:

1. An automatic V-belt transmission comprising:
   a drive pulley;
   a driven pulley; and a V-belt extending between the drive pulley and the driven pulley, wherein the drive pulley has:
- a fixed sheave which is rigidly fixed to a drive shaft of the drive pulley; and
- a movable sheave which is movable on the drive shaft in a direction of an axis of the drive shaft, wherein each of the fixed sheave and the movable sheave includes a conical pressure surface having an inclined angle with respect to a surface perpendicular to the axis of the drive shaft, respectively, and the conical pressure surface of the fixed sheave and the conical pressure surface of the movable sheave form a V-shaped groove of the drive pulley, which opens radially outwardly, in which the movable sheave is moved toward the fixed sheave by a propulsion generating mechanism for the drive pulley as rotational speed of the drive shaft increases, so that radius of contact of the drive pulley with the V-belt increases, wherein the conical pressure surface of one of the fixed sheave and the movable sheave is formed to have the inclined angle being constant from a radially inner part of the conical pressure surface to a radially outer part of the conical pressure surface, and wherein the conical pressure surface of the other of the fixed sheave and the movable sheave is formed to have an angular turning boundary that the inclined angle varies thereon, in which the inclined angle of a radially inner part inside the angular turning boundary of the conical pressure surface is smaller than the inclined angle of a radially outer part outside the angular turning boundary of the conical pressure surface, and in which an angular difference between the radially inner part of the conical pressure surface and a side edge surface of the V-belt is greater than an angular difference between the radially outer part of the conical pressure surface and the side edge surface of the V-belt.

2. The automatic V-belt transmission as claimed in claim 1, wherein said one of the fixed sheave and the movable sheave is constituted by the movable sheave, and wherein said other of the fixed sheave and the movable sheave is constituted by the fixed sheave.

3. The automatic V-belt transmission as claimed in claim 1, wherein the angular turning boundary of the conical pressure surface is provided in a vicinity of a position at which a maximum width part of the V-belt contacts the conical pressure surface when the V-belt and the drive pulley are at a position of maximum reduction in speed.

4. The automatic V-belt transmission as claimed in claim 1, wherein the inclined angle of the radially outer part outside the angular turning boundary of the conical pressure surface of said other of the fixed sheave and the movable sheave is equal to the inclined angle, being constant, of the conical pressure surface of said one of the fixed sheave and the movable sheave.

5. The automatic V-belt transmission as claimed in claim 1, wherein said one of the fixed sheave and the movable sheave has a higher rigidity than a rigidity of said other of the fixed sheave and the movable sheave.

6. The automatic V-belt transmission as claimed in claim 5, wherein said one of the fixed sheave and the movable sheave is constituted by the fixed sheave, and wherein said other of the fixed sheave and the movable sheave is constituted by the movable sheave.

* * * * *